March 29, 1927.   1,622,768
H. D. COOK ET AL
PIPE JOINT AND CONNECTION
Filed Oct. 6, 1924
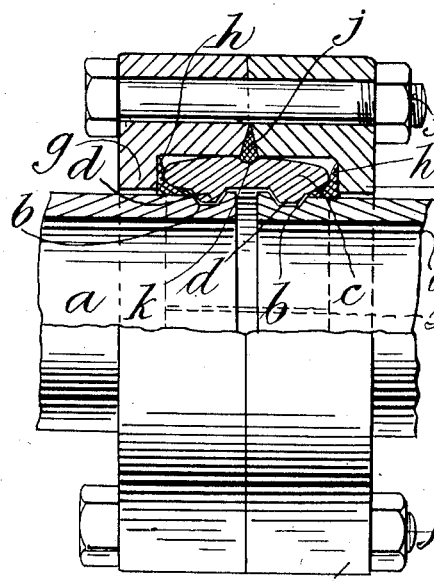
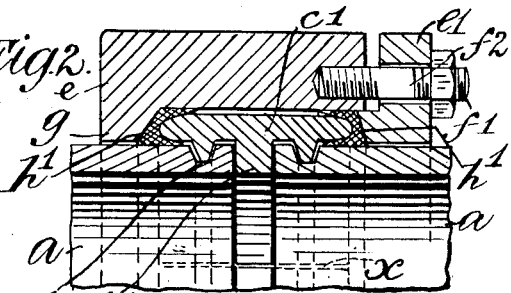
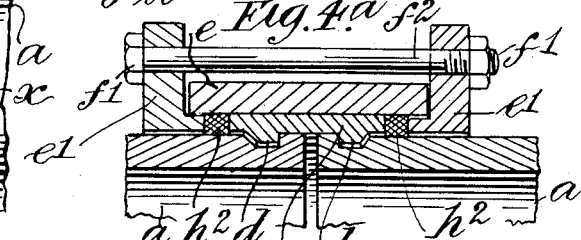
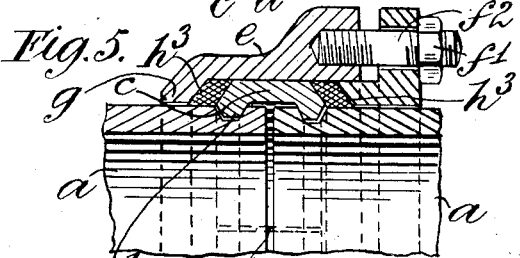
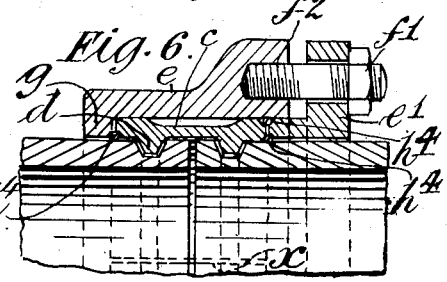
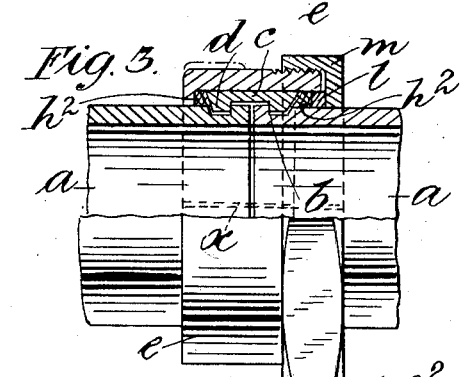
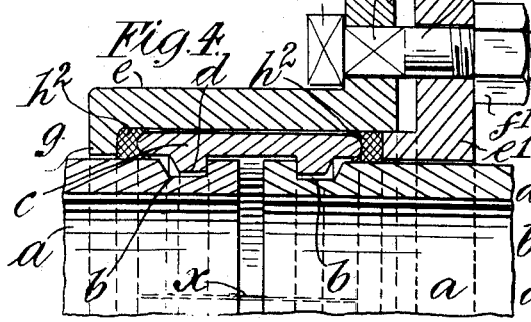
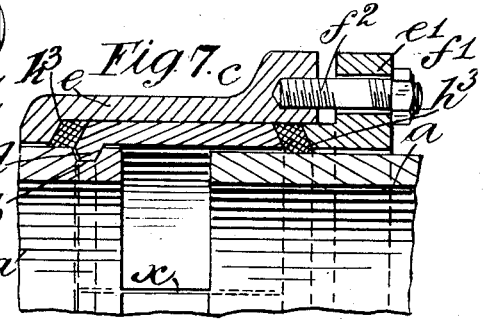

Patented Mar. 29, 1927.

1,622,768

UNITED STATES PATENT OFFICE.

HENRY DENMAN COOK, OF KINGSWAY, LONDON, AND GUSTAF HARALD LUNDGREN, OF PUTNEY, LONDON, ENGLAND.

PIPE JOINT AND CONNECTION.

Application filed October 6, 1924, Serial No. 741,984, and in Great Britain June 4, 1924.

This invention comprises improvements in and connected with pipe joints and connections and relates to pipe joints of the kind comprising a sleeve or housing encircling the juxtaposed ends of metal pipe lengths and enclosing packing rings which may be of the self-sealing variety.

The joints in question are generally intended for iron or steel pipes, employed in laying water, oil, gas, air or steam mains, in which employment it is desirable for the joints to permit of a certain amount of flexibility so as not to be affected by slight inaccuracy in pipe alignment and also to permit of a certain amount of expansion and contraction in the pipe line.

It is important to avoid the formation on the pipe ends of flanges, shoulders or enlargements of any kind for the engagement of split housings enclosing the packing, as these formations make the pipes more costly to manufacture and increase the cost of their freightage besides being disadvantageous in the transport of the pipes. It is also of importance to employ jointing means adapted for offering positive resistance to the entry of fluid into the pipe under external pressure, so that the pipe line may be rendered suitable for carrying a vacuum instead of a pressure fluid. In most uses of pipes of the kind in question, resistance to external pressure at the joints is necessary as it should not be possible, for example, for a water main to be polluted by the entry of foul liquid under external pressure, in the event of the main being temporarily emptied.

The object of the present invention is to provide jointing means of the kind referred to, adapted for satisfying the foregoing requirements and also for positively locating the jointing means on the pipe ends, while connecting the latter together and providing abutments for the packing within the housing of such jointing means.

According to this invention, a ring or sleeve, hereinafter referred to as the locating ring, is situated internally of the housing so as to enclose or encircle the adjacent pipe ends, and is formed with internal projections for engaging with grooves or depressions formed in the end portions of the pipe lengths, the said locating ring being further adapted for serving as an abutment for the packing rings disposed between the ends of such ring and the end walls of the housing or housing parts. The locating ring will be usually divided into two or more segments for enabling it to be applied to the pipe ends, and these segments, if desired, may be bolted or fastened together around the pipe ends. In some constructions, self-sealing packing rings of the hollow variety comprising sealing lips adapted to tighten under internal pressure after the principle of the U-section washer, may be employed. In other constructions, packing rings of square, round, triangular, conical, or other cross section may be employed. The housing may be divided circumferentially, thus giving two annular portions which can be connected together with great strength by a number of bolts around the circle. However, in some constructions, the housing may be divided into semi-circular or other segments, suitably bolted together. In these constructions of jointing means, no circumferential breaking stresses are imposed on the locating rings as all circumferential stresses of importance are borne by the housing. Also, no circumferential breaking stresses are imposed upon the grooved pipe ends within the housing as the pressure having access to the exterior of such ends balances the internal pressure thereon. Finally, the housings may comprise a cylindrical body and annular end closures or glands therefor.

In order to enable the invention to be readily understood, reference is made to the accompanying drawing, illustrating examples of practical constructions embodying the improvements, in which drawing:—

Figure 1 is a sectional side elevation of two flangeless pipe ends jointed together by the aid of the locating ring and self-sealing packing rings contained within a housing circumferentially divided.

Figures 2 and 4 to 7 are longitudinal sections of the upper halves of modified joints employing different forms of locating ring, different forms of packing and different forms of housing.

Figure 3 is a sectional elevation of a modified jointing means suitable for pipes of relatively small bore.

Referring to Figure 1, $a$ $a$ are adjacent pipe ends to be jointed together and in each such end there is formed a groove $b$ which may be made with sloping side walls as illustrated but which may be of rectangular or other shape in section. The pipe ends are encircled by a locating ring *c* formed with internal ribs *d* adapted for engaging in the grooves *b* of the pipe ends. This ring is called a locating ring because, being engaged with the pipe ends as shown, it positively locates the jointing means on the pipe ends and prevents movement along the pipes whilst also connecting the pipe ends and, excepting for a little play which may be allowed for expansion and contraction, preventing such ends from shifting in an axial direction relatively with one another. The ribs *d* are situated a little distance from respective ends of the locating ring and the latter is made in two or more segments (one division being indicated at *x*) so as to enable this ring to be applied around the pipe ends, as will be readily understood. The segments of the locating ring may be fastened together, or they may be left free of one another as shown. The housing *e* is in the form of a stout metal sleeve divided circumferentially into halves which are bolted together by a suitable number of bolts *f*, two only of which are shown. The internal diameter of the hollow part of the housing *e* is only slightly greater than the external diameter of the locating ring *c*, the ends of the hollow space being closed by annular flange parts *g* having an inner diameter slightly greater than the external diameter of the pipes *a*. Between the inner face of each flange *g* and the adjacent end of the locating ring, there is situated a somewhat L-section packing ring *h* presenting self-sealing lips one of which lies against the face of the flange whilst the other extends within the end portion of the locating ring and lies against the cylindrical surface of the pipe. The ends of the locating ring *c* may be shaped to suit the packing rings with which they engage. In order to make tight the joint between the faces of the housing parts, the latter may be bevelled at their inner periphery to receive a packing ring *j* and the inner periphery of this ring may seat in an annular groove *k* formed in the periphery of the locating ring *c* as shown in Figure 1. The packing ring *j* is self-sealing under the action of internal pressure and is sufficiently supported for sealing against such external pressure as may be experienced.

In assembling the jointing means seen in Figure 1, the parts of the housing *e* are passed on to the pipe ends before bringing the latter together and are kept apart when the said ends are brought close to one another. The packing rings *h* are applied to the pipe ends and the halves or segments of the locating ring *c* are then put together around such ends and so that their ribs *d* engage with the grooves *b*. The housing parts are now brought together by slipping them along the pipe ends, the packing ring *j* having been placed in position around the locating ring *c*. Upon tightening up the nuts on the bolts *f* the packing rings *h* are engaged or compressed between the suitably shaped ends of the locating ring *c* and the inner faces of the flanges *g* and the packing ring *j* is compressed between the bevelled portions of the meeting faces of the housing parts and tightly engages the peripheral seating around the locating ring *c*. The lips of the packing rings *h* are free to be tightly sealed against the appropriate surfaces within the joint as also is the packing ring *j* under the action of the pressure admitted to the interior of the housing *e* through the gap between the pipe ends, when the pipe line is under pressure. In the event of the pipe being emptied or under reduced pressure, the said packing rings, being tightly abutted against the locating ring *c*, will offer positive resistance against the entry of external fluid into the pipe line. It is to be observed that with this construction, the grooving of the pipe ends does not contribute a weakness, as regards circumferential stresses, in the event of the pipe having to carry pressure fluid, because the self-sealing lips are situated beyond the respective grooves *b* so that the internal pressure is applied to the exterior as well as to the interior of the grooved pipe ends and a hydraulic balance is obtained over such grooved portions. Also, the locating ring *c* is not subjected to any notable circumferential stress as it is possible for the internal pressure to have access to the exterior of the locating ring and to balance the pressure on the interior.

As regards longitudinal stresses they are usually much less in magnitude than the circumferential stresses, so that the grooving does not diminish the security or safety of the pipes. In the case where the end forces are due to the fluid pressure acting on a surface equivalent to the cross section of the pipe the intensity of stress in the longitudinal direction is half that in the circumferential direction and the groove of a single end can be cut so as to reduce the section of metal by one half without reducing the safety of the pipe. The locating ring is adapted for transmitting these longitudinal forces when such occur.

According to the modification illustrated in Figure 2, the housing *e* is flanged at one end only, and the right hand end is closed by a sort of gland *e'* which constitutes a housing part and is capable of being tightened against the packing in the housing by means of the nuts *f'* screwing on to the studs $f^2$ fixed in the end of the housing. Moreover, modified packing rings *h'* of a somewhat U-section are used, these rings presenting self-sealing lips above and beneath the locating ring *c'*. Finally, the locating ring itself is modified, inasmuch as it is provided with a central internal rib $d'$ for taking between the adjacent pipe ends. The filling of the gap by the central rib $d'$ avoids eddying and affords a smooth flow for liquid in the pipe line. The modification in Figure 2 will not require further description, as it is so similar to the construction described with reference to Figure 1. It may be remarked, however, that in this modification, the packing ring $j$ is dispensed with and further that, if desired, instead of two separate packing rings $h$ in Figure 1 and $h'$ in Figure 2, the upper lips of such rings may be joined by an integral layer of rubber or other flexible packing medium extending over the locating ring and bearing against the inner face of the housing $e$. With such a single piece packing ring, the whole of the hollow interior of the housing would be sealed and the packing ring $j$ in Figure 1 could be dispensed with. This one-piece packing is particularly suitable in the event of the housing being divided into two or more segments. It will also be apparent in Figure 2, that instead of the integral flange $g$ at the left hand side of the housing, a gland device similar to $e'$ could be applied at this end also in which event the housing might be said to comprise three parts. A construction comprising glands at each end will be described with reference to Figure 4ª.

The construction illustrated in Figure 3 is suitable for pipes of smaller diameter than those seen in Figures 1 and 2. According to this modification, the locating ring provides abutments for somewhat square section packing rings $h^2$, one of the latter being disposed between an integral flange of the housing and one end of the locating ring, and the other being disposed between the opposite end of the locating ring and a gland ring $l$ which is forced into the housing by the screwing on of a screw cap $m$ which may be formed with a hexagon for the application of a wrench as seen in the lower half of this figure. If desired, the housing $e$ on which the cap $m$ is screwed may be formed with a hexagonal exterior as indicated by the dotted line in the left hand upper portion of this figure.

In the construction illustrated in Figure 4, square section packing rings $h^2$ are used as in Figure 3 and a gland device is used as in Figure 2. In this modification, however the gland device is tightened by nuts $f'$ screwing on to bolts $f^2$ which latter may be formed with square heads $f^3$ or with square shanks $f^4$. These bolts $f^2$ rest with their shanks $f^4$ in radial slots formed in an external flange $e^2$ on the housing $e$ and are thus prevented from turning.

In the construction illustrated in Figure 4ª each end of the housing $e$ is closed by a gland device $e'$ and the two gland devices are drawn together and inwardly of the housing by long bolts $f^2$ and nuts $f'$. It will be understood that packings of other sections than those shown may be employed in this construction. For example, it may be advantageous in some cases to employ conical packing rings, that is to say, packing rings presenting a wedge-shape in cross section. In the latter event, of course, internal surfaces of the parts would be modified to suit the particular packing adopted.

The construction seen in Figure 5 is very similar to that seen in Figure 2, the difference being that rhomboidal section packing rings $h^3$ are used and the ends of the locating ring segments $c$ are bevelled to suit the packing.

The modified construction illustrated in Figure 6 is similar in principle to those illustrated in Figures 2 and 5 but in this modification the parts are adapted for the use of smaller rings of packing material $h$ and which no longer fill the radial distance between the external periphery of the pipes and the internal periphery of the housing, but are placed so as to close the three cylindrical orifices shown in Figure 6 to prevent the escape of fluid. The appropriate parts of the locating ring, $c$, flange $g$ and gland device $e$, are bevelled for compressively engaging the packing rings $h^4$. The object of this modification is to create a much higher intensity of compression on the packing rings in order to make the joints effective for dealing with steam and similar fluids, the packing rings being made of soft copper or other suitable material. Naturally, if a gland device is used at the left hand side of the housing $e$ as well as at the right hand, a fourth packing ring $h^4$ will be necessary.

In laying a pipe line it is customary, at bends or other suitable places, to insert a jointing means adapted for permitting of expansion and contraction in the length of pipe line between such expansion joints. Even although the joints above described may permit of a limited amount of expansion and contraction, according to the degree of play allowed to the ribs $d$ in the grooves $b$, nevertheless it may be necessary to provide for a more extensive expansion and contraction and this may be accomplished by inserting jointing means, such as are illustrated in Figure 7, at bends or other points situated at desired distances apart in a pipe line. The construction illustrated in Figure 7 is similar to that illustrated in Figure 5, excepting that the parts have a greater length and the locating ring has only one rib $d$ for engaging one of the pipe ends, the other pipe end not being grooved and therefore capable of sliding through the gland device $e'$, the right hand packing ring $h^3$ and the locating ring $c$ when elongation or shortening of the pipe line takes place. In any of the constructions above described in which a gland device or devices $e'$ is or are employed, the cylindrical parts of such devices may be separated from the end ring or flange parts, in the same way that the gland ring 2 in Figure 4 is separated from the cap part $m$.

It is to be understood that any one of the constructions above described can be adapted for receiving any desired or suitable form of packing or any one of the kinds of packing herein described or referred to. Naturally, the end surfaces of the locating ring and the inner faces of the flanges and gland devices for engaging the packing rings will be so shaped as to produce the most desirable deformation of the packing rings for securing packing pressure and tightness, in the same way that the parts in question have been designed in accordance with the illustrations given in the accompanying drawing.

Packing rings used in these constructions need not be continuous or unbroken rings, as rings composed of overlapping segments, or split rings with overlapping ends may be used.

In any construction, it is possible to arrange for the gap between the pipe ends to be of such length as to permit the packing ring to be withdrawn through the same. It is then possible to renew packings in a pipe line without disturbing pipe lengths, as this can be accomplished by separating the housing parts $e$, or $e$ and $e'$ after removing the nuts or screws thereof, removing the halves or segments of the locating ring $c$, and then slipping the packing rings through the gap and inserting others in their place, as will be readily understood after the above description of the accompanying drawing.

The ribs $d$ shown throughout the drawings are bevelled either one or both sides. Ribs of any suitable cross section may be employed but bevelled ribs are advantageous in some respects. For example, the bevelling gives a greater thickness at the root of the rib and affords strength against shear stresses.

We claim:—

1. A pipe joint comprising a cylindrical housing, a locating ring wholly enclosed by said housing and having an external diameter less than the internal diameter of said housing whereby said ring is freely receivable into said housing, parallel internal annular projections spaced apart along said locating ring and adapted for having free revoluble engagement with annular surfaces of the pipe ends to be jointed, and packing rings confined between ends of the locating ring and annular housing.

2. A pipe joint comprising a cylindrical housing, a locating ring wholly enclosed by said housing and having an external diameter less than the internal diameter of said housing whereby said ring is freely receivable into said housing, parallel internal annular bevelled ribs spaced apart along said locating ring and adapted for having free revoluble engagement with annular grooves formed around the pipe ends to be jointed, and packing rings confined between ends of the locating ring and annular housing parts.

3. A pipe joint comprising a cylindrical housing having a body part and a gland part, a locating ring divided in a plane containing its axis and wholly enclosed by the cylindrical body of said housing, said ring having an external diameter less than the internal diameter of said cylindrical body whereby said ring is freely receivable into said body, seating surfaces formed on the ends of said ring, internal parallel ribs spaced apart along said ring and adapted for having free revoluble engagement with grooves formed around the pipe ends to be jointed, and packing rings adapted for being tightly compressed against said seating surfaces by the tightening of said gland part.

4. A pipe jointing means comprising a locating ring composed of a loose assemblage of segments having parallel internal annular ribs spaced apart, a housing comprising a sleeve and annular end parts, said sleeve wholly enclosing said ring and having an internal diameter greater than the external diameter of the ring formed by said assemblage whereby said ring is loosely encircled by said housing, packing rings, and means for compressively confining the latter between the annular end parts of the housing and the ends of said locating ring, the parallel annular ribs of the latter being adapted for having free revoluble engagement with annular formations of the pipe ends to be jointed.

5. A pipe jointing means comprising a discontinuous ring formed internally and adjacent to each end with an annular rib and having its ends shaped for compressively engaging compressible packing rings, a sleeve housing encircling and enclosing said ring, said ring and housing being located around and loosely clamping adjacent pipe ends formed with annular grooves for having free revoluble engagement with said ribs, annular closures for the ends of said housing, said closures being freely adjustable along said pipe ends, and compressible packing rings disposed between said closures and shaped ends of said ring.

HENRY DENMAN COOK.
GUSTAF HARALD LUNDGREN.